United States Patent Office 2,776,297
Patented Jan. 1, 1957

2,776,297

PROCESS FOR N,N-DIISOPROPYLBENZO-THIAZOLE-2-SULFENAMIDE

Herman Cherlow, North Plainfield, and Robert H. Ebel, Plainfield, N. J., assignors to American Cyanamid Company, New York, N. Y., a corporation of Maine No Drawing. Application November 30, 1955,
Serial No. 550,194

7 Claims. (Cl. 260—306.6)

This invention relates to sulfenamides. More particularly, it relates to benzothiazole-2-sulfenamides, especially N,N-diisopropyl-benzothiazole-2-sulfenamide. Still more particularly, it relates to a new process for preparing N,N-diisopropylbenzothiazole-2-sulfenamide.

Since the advent of mercaptobenzothiazole as a rubber vulcanization accelerator, extensive investigation has been conducted to uncover derivatives thereof useful for the same purpose. Among such derivatives which have been found of particular value are various benzothiazole sulfenamides. In particular, N,N-diisopropylbenzothiazole-2-sulfenamide has been found to be a particularly outstanding delayed action accelerator for both natural and synthetic rubbers.

Various procedures have been proposed for preparing benzothiazole sulfenamides in general. None of these, however, has proved to be capable of producing N,N-diisopropylbenzothiazole-2-sulfenamide in such yield and purity as to achieve commercial acceptance. One such procedure which has been found to be successful in the preparation of certain benzothiazole sulfenamides comprises reacting an alkali metal salt of mercaptobenzothiazole with an N-halogen amine in aqueous or alcoholic solution while heating. Another suggested procedure also found successful in the preparation of certain sulfenamides involves the reaction of an alkali metal salt of mercaptobenzothiazole with a primary or secondary amine in water in the presence of an oxidizing agent such as sodium hypochlorite. These procedures, however, have not proved to be completely satisfactory for the commercial preparation of N,N-diisopropylbenzothiazole sulfenamide. By either procedure the yield of product is low and the quality is of such a poor nature as to require costly and time-consuming purification procedures to obtain a product meeting commercial specifications.

There has remained, therefore, an unfulfilled need for a process of producing N,N-diisopropylbenzothiazole-2-sulfenamide. This need, moreover, has become acute because of a recent sharp increase in demand for this compound as a delayed action rubber accelerator.

It is a primary object of this invention to provide a process which will fulfill this need. Such a process should not be subject to the various disadvantages of the prior art procedures. It should be capable of producing N,N - diisopropylbenzothiazole - 2 - sulfenamide in high yield. The product so obtained should be of such purity as to be capable of direct use as a rubber accelerator without added purification steps. These results, moreover, should be obtained without the necessity of using large excesses of any material. In addition, the reaction mixture should be readily subjected to recovery of the product as well as by-products or unused reactants. Particularly, the process should be straightforward, requiring no complex equipment or control whereby it may be conducted with a minimum of supervision.

Surprisingly, in view of the inadaptibility of prior art procedures to the preparation of N,N-diisopropylbenzothiazole-2-sulfenamide, this object has been met by a process simple in operation yet effective in a manner heretofore unrealized as well as unexpected. In general, the instant process is a modification of the prior art process in which a metallic or ammonium salt of mercaptobenzothiazole is reacted with N-chlordiisopropylamine in an aqueous medium. It differs, however, in that the reaction is conducted in the presence of at least a minimum amount of diisopropylamine and under controlled conditions of hydrogen ion concentration. In this manner, N,N-diisopropylbenzothiazole-2-sulfenamide is easily obtained in a purity satisfying commercial requirements without practicing any purification procedure. Moreover, this product is obtained in a yield never before contemplated by prior art methods.

One of the unusual aspects of the process of this invention is the fact that preformed N-chlordiisopropylamine is employed as a reactant. It is well-known that N-chloramines, in general, are quite unstable and tend to decompose appreciably in a short time, sometimes violently. Unexpectedly, however, N-chlordiisopropylamine is quite stable and does not present a handling problem common to so many N-chloramines. Even after storage periods of a week and even longer, decomposition of N-chlordiisopropylamine takes place to the extent of less than about one percent. The process of this invention, therefore, is not only unusual in that it obtains a product of unexpected purity and yield, but also because these results are obtained using a reactant which belongs to a class of compounds which, in general, are difficult to prepare and handle.

The particular method by which the N-chlordiisopropylamine is prepared forms no part of this invention. It may, for instance, be prepared by adding diisopropylamine to an aqueous solution of sodium hypochlorite. After reaction is complete, the layer of N-chlordiisopropylamine may be separated from the aqueous layer by known means. Other procedures for preparing N-chlordiisopropylamine may just as readily be employed.

The salt of mercaptobenzothiazole employed may be any water-soluble salt such as the ammonium, alkali metal and alkaline earth metal salts. The sodium salt being commonly available, it forms a preferred embodiment of this invention. The salt, whichever it may be, and the N-chlordiisopropylamine, by whatever method prepared, are then brought together in an aqueous medium. The use of the reactants in chemically equivalent amounts provides satisfactory results. It is desirable, however, in order to obtain optimum results, to employ the N-chlordiisopropylamine in a slight stoichiometric excess.

It is essential, in accordance with the process of this invention, that diisopropylamine be present in the reaction medium during the reaction. It is to the presence of the free amine that the exceptional results of this invention are in part attributable. The amount of diisopropylamine employed should preferably provide a mol ratio to the total mercaptobenzothiazole content of at least about 1.75:1. Amounts of diisopropylamine such as to provide ratios less than this result in products of progressively lower purity. Amounts larger than that described may be employed but no added advantage is gained by using diisopropylamine in an amount greater than that which provides a mol ratio with the mercaptobenzothiazole content of about 2:1. In fact, it is not only a feature of this invention that the presence of diisopropylamine provides such unexpected results but that these results are obtained by the use of such small amounts of the amine.

Control of the hydrogen ion concentration is also an important feature of the process of this invention. It has been found that the hydrogen ion concentration of the reaction mixture should be maintained equivalent to a pH range of about 11.0–13.0. Beyond this range, noticeably less pure products are obtained. For optimum results, it is preferred to conduct the reaction at a pH of about 11.8–12.5. Control of the hydrogen ion concentration is preferably conducted by buffering the solution with any suitable buffer. Mono- and disodium phosphate are especially suitable buffers for the purposes of this invention.

The actual bringing together of the reactants and allied materials may be conducted in any of various ways. Thus the salt of mercaptobenzothiazole may be added to an aqueous mixture containing N-chlordiisopropylamine, diisopropylamine and the buffer. Alternately the salt of mercaptobenzothiazole and the N-chlordiisopropylamine may be fed simultaneously into an aqueous solution of the buffer and the free amine. Whatever the particular mode of addition of the materials, the temperature is preferably kept at about 15° C. during the period of addition and then raised to about 40–45° C. to complete the reaction.

After completion of the reaction, whether conducted continuously or batchwise, the liquid layer containing the product is separated from the water layer. Any water present in the product layer as well as the free amine are then removed by distillation under reduced pressure and the residue solidified. The product is obtained in a high yield and of such purity that no further purification steps are necessary. The aqueous layer may be conveniently recycled as make-up water.

The process of this invention is further illustrated by the following examples which are illustrative only. All parts are by weight unless otherwise noted.

EXAMPLE 1

*Preparation of N-chlordiisopropylamine*

To an aqueous solution of 262 parts of sodium hypochlorite, containing 32.4 parts of available chlorine, is added 46.1 parts of diisopropylamine at such a rate that a temperature of 15–20° C. is maintained. The mixture is stirred at room temperature for 30 minutes until the reaction is complete. The product is then separated from the aqueous layer to give 61.5 parts of N-chlordiisopropylamine.

EXAMPLE 2

To a solution of 1.6 parts of disodium phosphate in 87 parts of water is added 84.6 parts of diisopropylamine, cooled to about 15° C. and 3 parts of the N-chlordiisopropylamine of Example 1 added thereto. To this solution having a pH of 12 are fed gradually and simultaneously 59.8 parts of N-chlordiisopropylamine and 232 parts of an aqueous solution containing 69.5 parts of mercaptobenzothiazole as the sodium salt. The reaction mixture is heated to 40–45° C. until the reaction is complete and the two liquid layers separated. The water insoluble layer containing the product is washed at 40–45° C. with 87 parts of water containing 1.6 parts of disodium phosphate and then subjected to a brief vacuum distillation to remove water and diisopropylamine. The residue when cooled and flaked gives 100 parts of N,N-diisopropylbenzothiazole-2-sulfenamide of 99% purity melting at 58.5° C. This represents a 90% yield based on mercaptobenzothiazole. The aqueous layer is treated for recovery of diisopropylamine while the wash water layer may be recycled to the next batch as make-up water.

EXAMPLE 3

To 97 parts of water are added 1.9 parts of disodium phosphate, 86 parts of diisopropylamine, 63.5 parts of N-chlordiisopropylamine and 7 parts of sodium hydroxide. The mixture having a pH of 11.9 is agitated and cooled to 20° C., and 282 parts of a solution of sodium benzothiazole mercaptide containing 70.5 parts of mercaptobenzothiazole added over a period of 3 hours. The product is isolated by the procedure described in Example 2 to give 100 parts of N,N-diisopropylbenzothiazole-2-sulfenamide of 97.5–98% purity melting at 57.5–58° C. This represents a yield of 89% based on mercaptobenzothiazole.

EXAMPLE 4

A reactor is charged with 86.3 parts of water, 3.9 parts of monosodium phosphate, 2 parts of flake caustic, 78.4 parts of diisopropylamine and 62.7 parts of N-chlordiisopropylamide. The pH of the mixture at this point is about 11.5–12.5. The mixture is cooled to about 15° C. and 201 parts of a solution of the sodium salt of 2-mercaptobenzothiazole containing 67.9 parts of 2-mercaptobenzothiazole added while maintaining the temperature from 15–25° C. When the reaction is complete, the mixture is heated to 40–45° C. for one hour. The brine layer is separated from the organic layer and the latter subjected to vacuum distillation to remove all solvent. The residue when cooled and flaked gives 100 parts of N,N-diisopropylbenzothiazole-2-sulfenamide of 99% purity melting at 58.5° C. This represents a yield of 95% of theory.

We claim:

1. A process for preparing N,N-diisopropylbenzothiazole-2-sulfenamide which comprises: bringing together a water-soluble salt of 2-mercaptobenzothiazole and about a chemically equivalent amount of preformed N-chlordiisopropylamine in an aqueous reaction medium; said reaction medium also having present therein diisopropylamine; the pH of said reaction medium being about 11.0–13.0, said pH range being maintained until reaction of said salt of 2-mercaptobenzothiazole and said N-chlordiisopropylamine is complete; and recovering N,N-diisopropylbenzothiazole-2-sulfenamide from the reaction mixture.

2. A process according to claim 1 in which the salt is the sodium salt and the mol ratio of diisopropylamine to mercaptobenzothiazole is at least 1.75:1.

3. A process according to claim 2 in which the pH is about 11.8–12.5 and the diisopropylamine:mercaptobenzothiazole mol ratio is about 1.75–2:1.

4. A process according to claim 3 in which the pH range is maintained by the presence in the reaction medium of a buffer.

5. A process according to claim 4 in which the buffer is monosodium phosphate.

6. A process according to claim 4 in which the buffer is disodium phosphate.

7. A process for preparing N,N-diisopropylbenzothiazole-2-sulfenamide which comprises: preparing an aqueous mixture comprising N-chlordiisopropylamine, diisopropylamine and a buffer selected from the group consisting of monosodium phosphate and disodium phosphate, the pH of said solution being from about 11.0–13.0; adding sodium mercaptobenzothiazole to said solution, the total amount added being about chemically equivalent to the N-chlordiisopropylamine and in a mol ratio to the diisopropylamine of about 1:1.75–2.0; heating the resultant mixture to 40–50° C. until reaction is complete; and recovering N,N-diisopropylbenzothiazole-2-sulfenamide.

References Cited in the file of this patent

UNITED STATES PATENTS

Re. 19,286     Zaucker et al. _____ Aug. 21, 1934

OTHER REFERENCES

Carr et al.: J. Org. Chemistry, pp. 921–34, vol. 14 (1949).